United States Patent [19]
Rahman

[11] Patent Number: 5,794,416
[45] Date of Patent: Aug. 18, 1998

[54] COMPUTER CONTROLLED SYSTEM FOR LOADING PALLETS IN A CONFINED CARGO AREA

[75] Inventor: Kem M. Rahman, Plano, Tex.

[73] Assignee: Recot, Inc., Pleasanton, Calif.

[21] Appl. No.: 732,198

[22] Filed: Oct. 16, 1996

[51] Int. Cl.[6] .................... B65B 53/00; B65B 35/50
[52] U.S. Cl. .................. 53/540; 53/168; 53/157; 53/171; 53/556; 53/587; 53/244
[58] Field of Search .................. 53/556, 587, 168, 53/154, 157, 171, 174, 244

[56] References Cited

U.S. PATENT DOCUMENTS

| | | |
|---|---|---|
| Re. 33,416 | 10/1990 | Konishi et al. . |
| 1,518,278 | 12/1924 | Schroeder et al. . |
| 3,705,410 | 12/1972 | Kooy et al. . |
| 3,913,757 | 10/1975 | Lovey . |
| 4,093,084 | 6/1978 | Ringer . |
| 4,103,789 | 8/1978 | Andrews et al. . |
| 4,692,876 | 9/1987 | Tenma et al. . |
| 5,007,521 | 4/1991 | Kanaka . |
| 5,015,145 | 5/1991 | Angell et al. . |
| 5,050,090 | 9/1991 | Golub et al. . |
| 5,052,882 | 10/1991 | Blau et al. . |
| 5,175,692 | 12/1992 | Mazouz et al. . |
| 5,203,671 | 4/1993 | Cawley et al. . |
| 5,222,857 | 6/1993 | Hasegawa . |
| 5,372,473 | 12/1994 | Moyden et al. . |
| 5,380,139 | 1/1995 | Pohjonen et al. . |
| 5,391,038 | 2/1995 | Stewart . |
| 5,391,046 | 2/1995 | Colamussi . |
| 5,403,142 | 4/1995 | Stewart . |

*Primary Examiner*—Linda Johnson
*Attorney, Agent, or Firm*—Jones, Day, Reavis & Pogue

[57] ABSTRACT

A system for configuring a stack of layers of boxes to fill an enclosed compartment or cargo space in sequential stack positions according to measurements of the compartment as stored by a computer and the box layer height as determined by the computer. The computer calculates the maximum height of the stack and each predetermined stack location within the cargo space necessary to fill the enclosed cargo space and, through a programmable logic controller, directs a delayering clamp to index itself relative to a stack of boxes, and then removes as many boxes as necessary from the stack. The remaining layers of boxes in the stack are then fed to a stretch-wrap station where the remaining layers of the stack are rotated while the stretch wrap is being applied. The stretch-wrapped stack is then transferred to a station for holding for a forklift or other device to take it into the enclosed cargo area and stack it. A novel slip sheet is placed under each stack as it is moved into place under the load delayering clamp. It has a front portion that acts as a tongue that can be gripped by a special fork loader. It also has two sides that are folded up and encompassed by the stretch wrap to form a solid base for the carton stack. The tongue on this slip sheet allows a special push-pull attachment for the forklift to stack and to unstack the pallets.

14 Claims, 5 Drawing Sheets

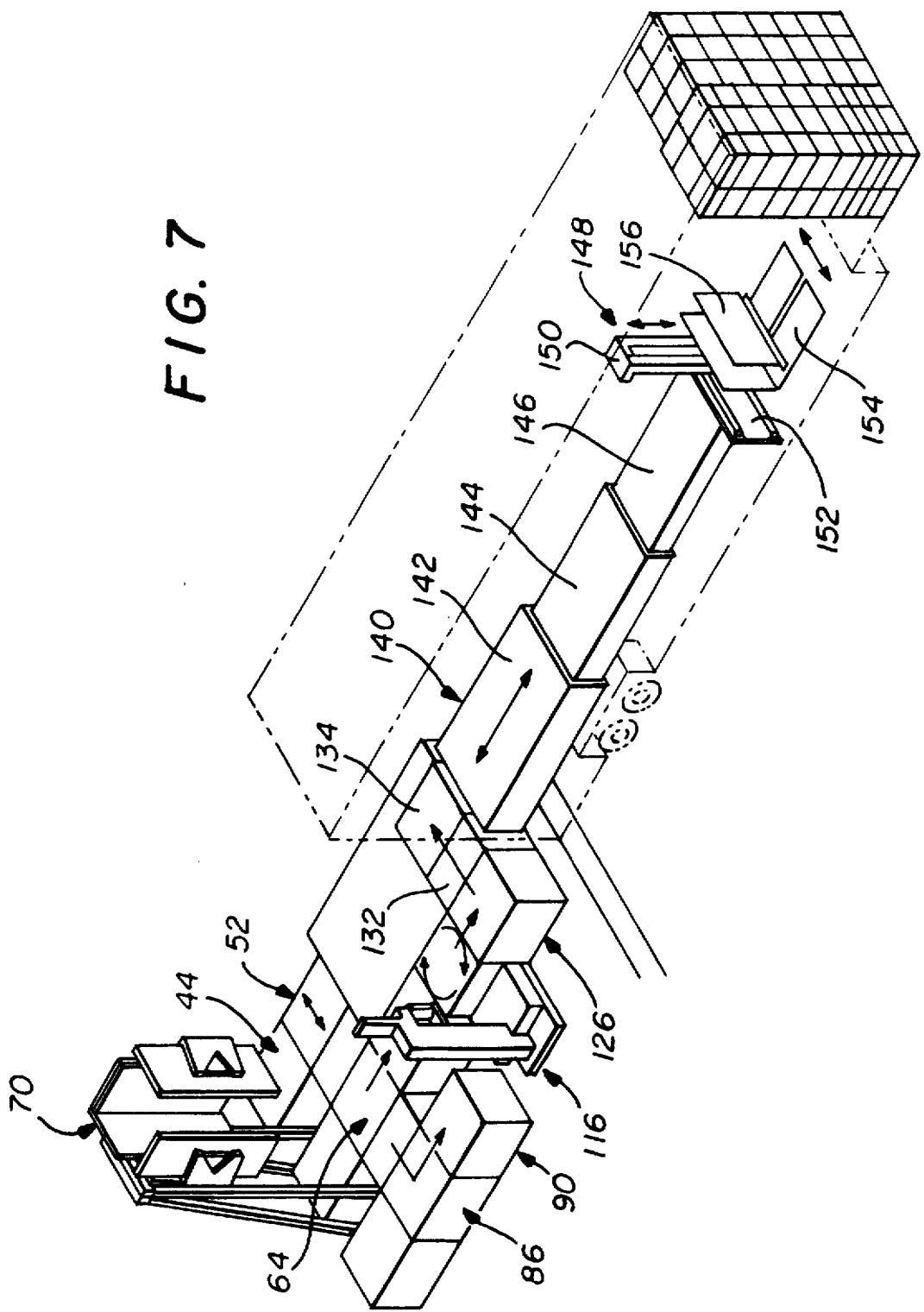

COMPUTER CONTROLLED SYSTEM FOR LOADING PALLETS IN A CONFINED CARGO AREA

BACKGROUND OF THE INVENTION

1. Field of the Invention

The present invention relates generally to a system for loading pallets of boxes into an over-the-road vehicle and in particular to a computer controlled semiautomatic system for loading such vehicle in which the inner dimensions of the vehicle are stored in a microprocessor and the microprocessor varies the heights of the pallets of boxes that are being loaded into the vehicle such that maximum use of the space in the vehicle is realized.

2. Description of Related Art Including Information Disclosed Under 37 CFR 1.97 and 1.98

Loading boxes or cartons of various heights in enclosed cargo areas such as over-the-road cargo vehicles is a significant problem. First, trailer cube utilization is a prime consideration when loading and transporting products for distribution. Because of the height difference of a fully loaded pallet and the inside height of the cargo vehicle or trailer, loading pallet quantity (bulk loading) by a fork truck will leave 30% of the trailer cube unutilized. Therefore, several different dead stacking methods are used for bulk loading of trailers.

In one embodiment, a fork truck driver brings a full pallet of cartons and places it on a removable pallet stand inside the trailer. A loader (or the fork truck driver himself) takes cartons off the pallet and stacks the cartons in columns to fill up the entire height of the trailer. The current two-man loading operation is inefficient, strenuous, and creates product damage. The loading efficiency is impacted by weather conditions as well.

There are systems that will automatically load pallets into an enclosed cargo space such as that disclosed in U.S. Pat. No. 5,403,142. However, the same problem exists. That is because of the height difference of a fully loaded pallet and the inside height of the cargo vehicle or trailer, loading the pallets automatically will leave 30% of the trailer cube unutilized.

SUMMARY OF THE INVENTION

The present invention relates to a loading system that configures a stack of layers of boxes to fill an enclosed compartment in sequential stack positions according to measurements of the compartment as stored by a computer and the box layer height as determined by the computer. Specifically, the device employs a computer or programmable microprocessor to calculate the maximum height of a stack in each predetermined stack position necessary to fill the enclosed cargo space, directs a delayering clamp to index itself relative to a stack of boxes, and then removes as many layers of boxes as necessary from the stack. A slip sheet is placed under the delayered stack. The delayered stack is then fed to a stretch-wrap station where the stack is rotated while the stretch wrap is being applied. The stretch-wrapped stack is then transferred to a station for holding for a forklift or other device to take the stack into the truck and stack it. In an alternate version, an automatic conveyor system extends into and retracts from the body of the truck being loaded. The pallets are stacked by a special loader on the end of the conveyor system. The loader can turn 180°, pick up a pallet, rotate back 180°, and then stack the pallets in the proper horizontal and vertical location on the stack.

A microprocessor or other programmable logic controller receives sensor input concerning stack height, product type, and case layer height. Data concerning the type of trailer that is being loaded is entered into the processor through a keyboard. Thus a trailer file is established in the computer that will have the type and dimensions of each truck or trailer that is being loaded. The product file established in the computer will have the height of the case layer and the product stored therein.

A programmable logic controller (PLC) takes the data stored in the microprocessor and positions the stack such that, according to the calculations of the microprocessor, a number layers of cases are removed from the stack by a delayering clamp, as necessary to fill a predetermined stack position in the trailer or enclosed cargo vehicle to its maximum. Thus, for example, if the enclosed vehicle could receive a stack of 12 boxes of a particular height box, and the pallets are stacked eight high, the PLC would cause the load delayer clamp to remove four layers of boxes from one stack, leaving four layers of boxes in the stack. Those four layers of boxes that were left would be sent to the stretch-wrap station so that they could be formed into a unitary group with the stretch wrap. From there the microprocessor transfers them to a holding point where a forklift can be used to pick them up and deliver them to a predetermined stack position in the trailer. The PLC will then take the remaining four boxes and stretch wrap them and place them in a holding pattern for the next calculation. Then a new stack of boxes 8 layers high would be moved directly to the stretch-wrap station to be stretch wrapped and moved to a waiting station where a forklift could take them into the trailer and place them on top of the four layer box stack already there to form a 12 box stack. In like manner, as the box layers vary in size, the microprocessor calculates the number of box layers needed in a stack to again occupy the maximum space in the trailer.

When a stack of boxes first arrives at the loading device detector station, a first sensor determines the height of the stack and a bar code reader identifies the product. In addition, a linear sensor determines the box layer height. This information is all fed to the microprocessor. By the time the pallet of boxes is moved from the detector station to the transfer station and then to the load delayering clamp, the microprocessor has determined how high the stack should be for a predetermined stack position and instructs the PLC to cause the load delayering clamp to move downwardly about the stack a sufficient distance to close its clamps, grip the layers of boxes that need to be removed, and raise them up, leaving the remaining layers of boxes to be transferred to the stretch-wrap unit.

A novel slip sheet is placed under each stack as it is moved into place under the load delayering clamp. Generally speaking, there is a pallet board under each stack as it moves to the delayering clamp. The delayering clamps lift the stack of boxes and the pallet board is automatically removed to a pallet board storage bin. The novel slip sheet is then placed under the stack and the delayering clamp lowers the stack onto the slip sheet. The slip sheet is formed of a material such as TEFLON® and has a front portion that acts as a tongue that can be gripped by a special fork loader that is a push-pull device. It also has two sides that extend outwardly from the stack of boxes and that are folded upwardly and encompassed by the stretch wrap to form a solid base for the carton stack. The tongue on the slip sheet is not folded upwardly and therefore allows a special push-pull attachment for the forklift to remove the pallets from wherever they are stored and to store them on top of a stack already existing so as not to injure or damage the boxes that already in the stack.

Thus it is an object of the present invention to provide a system and method for converting a two-person bulk loading and unloading operation into a single-person operation with full utilization of the trailer or enclosed cargo space.

It is a further object of the present invention to provide a system for efficiently loading the maximum number of boxes of product in an enclosed cargo space.

It is still another object of the present invention to provide a system for configuring a stack of layers of boxes to fill an enclosed compartment in predetermined sequential stack positions according to measurements of the compartment as stored by a computer and according to the box layer height as stored by a computer.

It is also an object of the present invention to provide a system for filling an enclosed compartment with stacks of box layers in sequential stack positions using a microprocessor to calculate the maximum height of the stack in each predetermined stack position necessary to optimize utilization of the enclosed cargo space and to use a delayering clamp to index itself relative to a stack of boxes and then remove as many layers of boxes as necessary from that stack such that the remaining boxes, when added to other box layers, will complete a maximum height stack in the enclosed compartment.

It is a further object of the present invention to stretch wrap all delayered stacks to ensure squareness of the cartons in a stack and the stability of the cartons in the stack.

It is still another object of the present invention to utilize a forklift to carry the stretch-wrapped stacks in sequence into the enclosed cargo space for stacking.

It is yet another object of the present invention to utilize an automatic loading device for carrying the stretch-wrapped stacks into the interior of the enclosed cargo space and stacking them.

It is also another object of the present invention to provide a novel slip sheet under each stack of carton layers that has a front portion extending beyond the edge of the stack, and that acts as a tongue that can be gripped by a special fork loader and two sides that extend beyond the carton stack and that are folded up and encompassed by the stretch wrap to form a solid base for the carton stack.

Thus the present invention relates to a system for efficiently loading the maximum number of layers of boxes of product in an enclosed cargo space comprising a first area for sequentially receiving stacks of boxes, each stack having layers of boxes of the same height that may or may not be the same height as the layers of boxes in the next sequentially received stack, a microprocessor for (1) storing a stack position and maximum height in a given sequential stack location in the enclosed cargo space, and (2) determining how many layers of boxes of sequentially received stacks must be placed in a given stack location in said cargo space to provide the maximum height stack in said given stack location, box delayering means coupled to the microprocessor for sequentially receiving the stacks of boxes from the first area and removing as many layers of boxes from each received stack as determined by said microprocessor to create said maximum height stack, a stretch-wrap machine for sequentially receiving the delayered stacks of boxes and stretch wrapping said delayered stacks, and a second area for sequentially receiving and temporarily storing the stretch-wrapped stacks of boxes such that they can be sequentially transported to the enclosed cargo area in predetermined order and stacked in each given stack location to maximize use of the enclosed cargo area.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which:

FIG. 7 is a diagrammatic arrangement of an alternate automatic embodiment of the present invention.

DETAILED DESCRIPTION OF THE PREFERRED EMBODIMENTS

Figure 1:
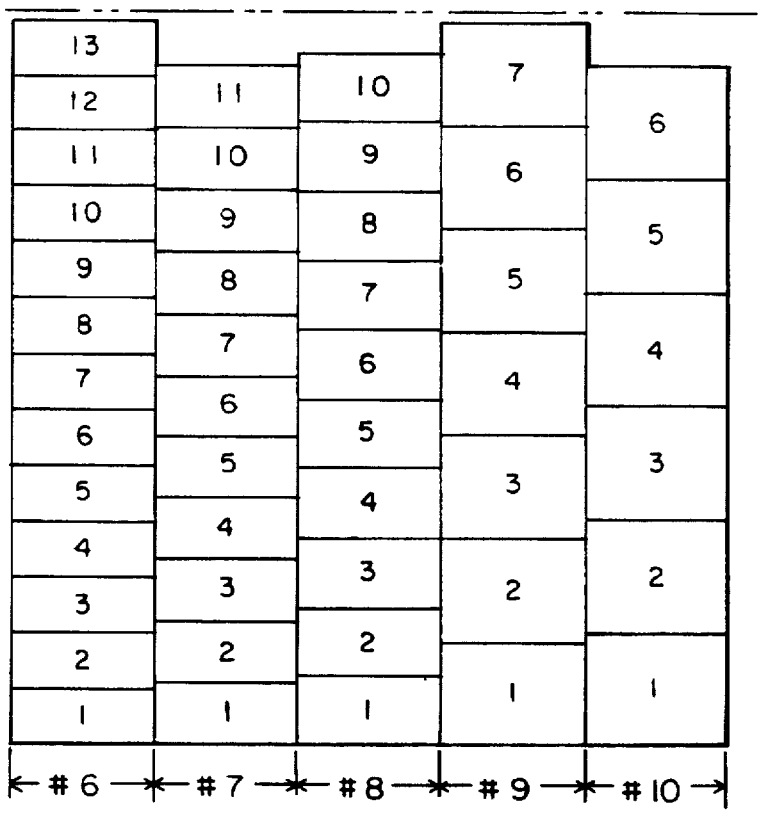
FIG. 1 is a front view of five stacks of boxes of different height that are typically used to transport products and which are used to form stacks of boxes to fill, to the maximum extent possible, the interior of a cargo vehicle.

The present invention contemplates the use of knockdown cardboard or any cartons to handle products such as bags of various edible chips or other commodities. For storage and transportation, cartons are typically palletized on a one-inch thick pallet board. Each pallet carries only one size of carton. The pallet height ranges from approximately 84 inches to 89 inches depending on the carton sizes. These pallets are placed in enclosed cargo containers such as E-vans to transport cartons of finished products in bulk (pallet) quantity from producing facilities to distribution centers. For maximum use of the cube space inside the trailers, in the past, the cartons were hand stacked inside the trailer. FIG. 1 illustrates five stacks of cartons of different sizes. The #6 cartons indicated in FIG. 1 are 6⅝ inches in height and 13 of them can be stacked on top of one another in the typical E-van interior. Number 7 cartons shown in FIG. 1 have a height of 7⅝ inches and 11 of them can be stacked in the conventional E-van interior. Number 8 cartons are 8⅝ inches in height and ten of them can be stacked to a maximum height inside the conventional E-van. Number 12 cartons are 12⅝ inches in height and seven of them can be stacked inside the conventional E-van. Finally, #14 cartons are 14⅝ inches in height and six of them can be stacked in the conventional E-van. All sizes of cartons have the same length and width (base area).

Typically, six cartons of any size box can be placed in one layer. Therefore, in 12 layers of #6 cartons, 72 cartons can be stacked. Six of the #7 cartons can be placed in one layer and, thus, with 11 layers, 66 cartons can be placed in one stack. Number 8 cartons can be packed six to a layer and, with ten layers, 60 cartons can be placed in one stack. Number 12 cartons can be placed six in a layer and, with seven layers, 42 cartons can be placed in one stack. Finally, #14 cartons can be placed six in a layer and, therefore, with six layers, 36 cartons can be placed in one stack.

Figure 2:
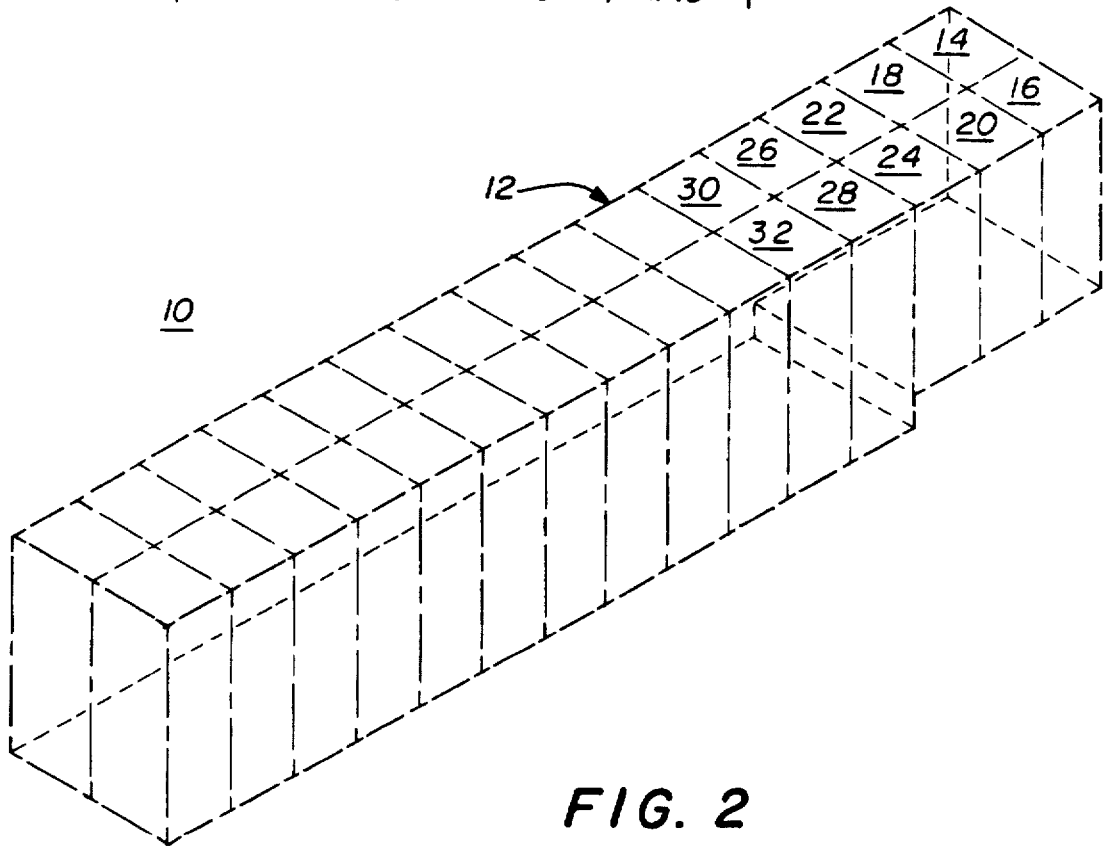
FIG. 2 is an isometric view of a typical 50-foot E-van cargo vehicle illustrating the predetermined pallet locations in the vehicle where pallets are to be stacked.

FIG. 2 is a schematic representation of an electronic van (E-van) trailer illustrating the inside dimensions as well as specified pallet locations within the trailer where pallets may be stored. Trailer cube utilization is a prime consideration when loading products for distribution. Because of the height difference of a fully-loaded pallet and the inside height of the trailer, loading pallet quantity (bulk loading) by a fork truck will leave 30% of the trailer cub unutilized. Therefore the present invention provides a way to maximize the use of the trailer cube.

Each of the #6, #7, #8, #12, and #14 cartons illustrated in FIG. 1 has a base area dimension of 20¹³⁄₁₆ length by 16⁵⁄₁₆ inch width. The heights have already been given. Note in FIG. 2 that the E-van 10 has a nose section 12 with a height of 108 inches on the inside diameter. This means, of course, that no matter which size of boxes is stacked in the nose section, unused space will be left above a single stack. The amount of layers of cartons that would be required to fill the remaining space depends of course upon the size of the cartons in the next stack. Thus, with the present invention, a computer determines the height of a first pallet of boxes or cartons, has them placed in the area designated by the numeral 14 in FIG. 2, and then calculates how many layers from the second stack of cartons, depending upon the height of each layer, would be required to fill the remaining space above the original stack and thus maximize use of the trailer. The remaining layers of cartons from the second stack are placed in area 16 as shown in FIG. 2 and the computer calculates how many layers of cartons from the third stack are needed to maximize the space in the E-van 10 when placed on top of the remaining layers of cartons in stack location 16. Those layers of cartons are then stretch wrapped and placed in stack position 16. The same procedure takes place for all of the space locations 18–32 in the front of the van and continuing on backwards to the back of the van to space locations 34 and 36.

Figure 3A:
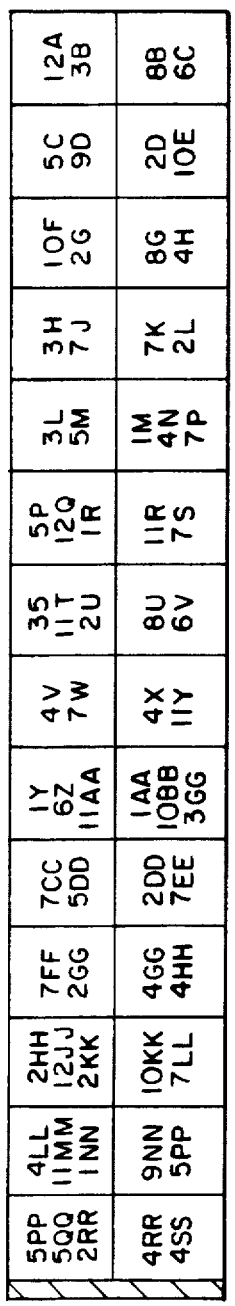
FIG. 3A is a plan view of the interior of the vehicle of FIG. 2 illustrating the number of layers of different type boxes that form each stack in each stack location in the van interior.

Table I illustrates the unit loading simulation of a 53 foot E-van and is read in conjunction with FIGS. 3A, B, and C. The first stack in the line item 1 contains 72 cases or cartons, is identified as pallet A, has a case size #6 with a case height of 6.63 inches. There are 12 layers per pallet and 72 total cases in the pallet. This pallet is identified as 12A in FIGS. 3A and 3C and is placed in stack location 14 (FIG. 2).

The next line item sets forth two pallets of #7 cartons identified as pallets B and C. Each has a case height of 7.63 inches with 11 layers per pallet and 66 cases per pallet. The computer calculates that three of the B/7 pallets can fill the remaining space to the maximum on the top of stack 12A in stack location 14. This is shown in FIG. 3A by the numeral 3B and is shown in FIG. 3C by the numeral 3B on top of the stack 12A.

Figure 3B:
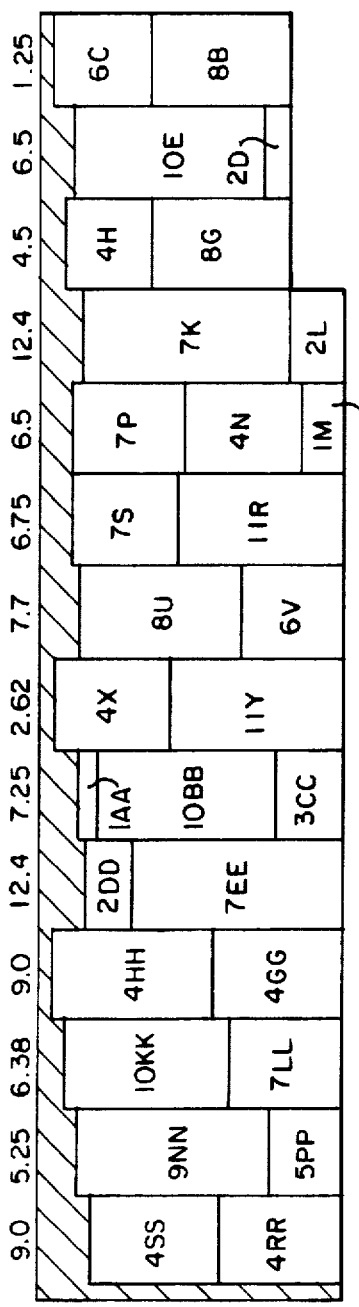
FIG. 3B is a side view of the layers of boxes of the different types that form stacks on one side of the vehicle as shown by lines B—B and FIG. 3A.

The remaining eight cases of the B pallet (8B) are then placed in stack location 16 illustrated in FIG. 2 and shown in FIGS. 3A and 3B. The computer then calculates that of the 11 layers of #7 cartons in the C pallet six of them (6C) could be placed on top of the eight layers from the B pallet (8B). Thus five layers of cartons (5C) are removed from the C pallet and the remaining six (6C) are stretch wrapped and placed on top of the 8B layers of cartons.

Figure 3C:
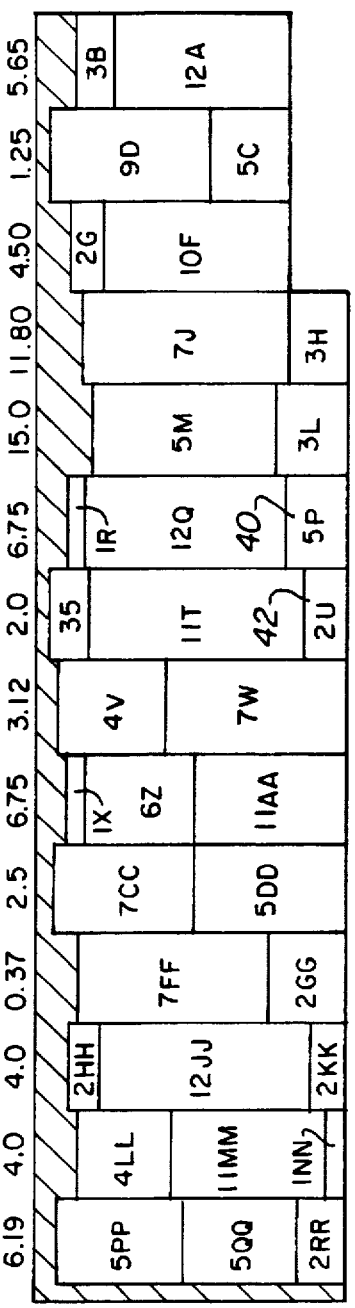
FIG. 3C is a side view of the layers of boxes that form the stacks in FIG. 3A taken along lines C—C.

The remaining five layers of cartons of the C pallet (5C) are stretch wrapped and placed at the base of pallet location 18 as shown in FIG. 2, and in FIG. 3A and FIG. 3C. The computer then calculates how many carton layers from the next stack, D, can be placed on top of the five layers from the C pallet. It calculates that nine layers of the D pallet (9D) can be placed on top of the five layers of the C pallet (5C). Thus it causes two layers (2D) to be removed from stack D and stretch wraps the remaining nine layers of cartons from the D pallet (9D) and places them on top of the five layers of cartons from the C pallet (5C) as illustrated in FIG. 2 and in FIG. 3C and FIG. 3A.

By continuing to follow the positioning of the stacks and the delayering of the cartons as shown in Table I and FIG. 3, it can be seen how the van is loaded to a maximum. Note, in stack locations 40 and 42 in FIG. 3C and the position 38 in FIG. 3B, that cartons from three different stacks have been used to form one stack in the van. Thus in position 38, one layer of cartons from stack M (1M) is placed on the bottom, four layers of cartons from stack N (4N) are placed on the one layer of cartons from stack M (1M), and seven layers of cartons from stack P (7P) are placed on top of the four layers of cartons from stack N (4N). Thus, the side views in FIGS. 3B and C illustrate that maximum utilization of the trailer space has been made.

As can be seen in the bottom row of Table I, 2208 cartons were in the stacks available and 2178 cases or cartons were loaded into the E-van leaving 30 cases or cartons that could not be loaded. The 2178 cases loaded included 474 cases or cartons in the nose portion of the E-van and 1704 cases or carton in the main body of the E-van.

TABLE I

UNIT LOADING SIMULATION OF A 53' E-VAN

BULKD5B  (METHOD = DELAYER PALLETS AS RECEIVED)

| Line Items | Cases/ L.I. | Pallet ID | Case Size | Case Ht. | Lr/Plt | Cs/Plt | Posit'n in Tri | 1st Pallet | Plt ID/ size | Exact Layer | 2nd Pallet | Plt ID/ size | Exact Layer | 3rd Pallet | Plt ID/ size |
|---|---|---|---|---|---|---|---|---|---|---|---|---|---|---|---|
| | | | | | | | | | NOSE 108 inch height | | | | | | |
| 1 | 72 | A | #6 | 6.63 | 12 | 72 | 1 | 12 | A/6 | 3.74 | 3 | B/7 | | | |
| 2 | 132 | B | #7 | 7.63 | 11 | 66 | 2 | 8 | B/7 | 6.16 | 6 | C/7 | | | |
| | | C | #7 | 7.63 | 11 | 66 | 3 | 5 | C/7 | 9.16 | 9 | D/7 | | | |
| 3 | 66 | D | #7 | 7.63 | 11 | 66 | 4 | 2 | D/7 | 10.8 | 10 | E/8 | | | |
| 4 | 222 | E | #8 | 8.63 | 10 | 60 | 5 | 10 | F/8 | 2.52 | 2 | G/8 | | | |
| | | F | #8 | 8.63 | 10 | 60 | 6 | 8 | G/8 | 4.52 | 4 | H/8 | | | |
| | | G | #8 | 8.63 | 10 | 60 | | | | | | | | | |
| | | H | #8 | 8.63 | 7 | 42 | TOTAL | 45 X | 6 = 270 | | 34 X | 6 = 204 | 270 | +204 | = 474 |
| Nose | 492 | | | | | 492 | | | BODY 126 inch height | | | | | | |
| 5 | 114 | J | #12 | 12.6 | 7 | 42 | 7 | 3 | H/8 | 7.93 | 7 | J/12 | | | |
| | | K | #12 | 12.6 | 7 | 42 | 8 | 7 | K/12 | 2.98 | 2 | L/12 | | | |
| | | L | #12 | 12.6 | 5 | 30 | 9 | 3 | L/12 | 6.03 | 5 | M/14 | | | |
| 6 | 60 | M | #14 | 14.6 | 6 | 36 | 10 | 1 | M/14 | 7.62 | 4 | N/14 | 7.98 | 7 | P/6 |
| | | N | #14 | 14.6 | 4 | 24 | | | | | | | | | |
| 7 | 276 | P | #6 | 6.63 | 12 | 72 | 11 | 5 | P/6 | 14 | 12 | Q/6 | 2.02 | 1 | R/6 |
| | | Q | #6 | 6.63 | 12 | 72 | | | | | | | | | |
| | | R | #6 | 6.63 | 12 | 72 | 12 | 11 | R/6 | 8.02 | 7 | S/6 | 1.02 | | |
| | | S | #6 | 6.63 | 10 | 60 | | | | | | | | | |
| 8 | 66 | T | #7 | 7.63 | 11 | 66 | 13 | 3 | S/6 | 13.9 | 11 | T/7 | 2.23 | 2 | U/8 |
| 9 | 120 | U | #8 | 8.63 | 10 | 60 | | | | | | | | | |
| | | V | #8 | 8.63 | 10 | 60 | 14 | 8 | U/8 | 6.61 | 6 | V/8 | | | |
| 10 | 66 | W | #12 | 12.6 | 7 | 42 | 15 | 4 | V/8 | 7.25 | 7 | W/12 | | | |
| | | X | #12 | 12.6 | 4 | 24 | 16 | 4 | X/12 | 11.4 | 11 | Y/6 | | | |
| 11 | 108 | Y | #6 | 6.63 | 12 | 72 | | | | | | | | | |
| | | Z | #6 | 6.63 | 6 | 36 | 17 | 1 | Y/6 | 18 | 6 | Z/6 | 12 | 11 | AA/6 |
| 12 | 72 | AA | #6 | 6.63 | 12 | 72 | 18 | 1 | AA/6 | 13.8 | 10 | BB/8 | 3.84 | 3 | CC/8 |
| 13 | 120 | BB | #8 | 8.63 | 10 | 60 | | | | | | | | | |
| | | CC | #8 | 8.63 | 10 | 60 | 19 | 7 | CC/8 | 5.2 | 5 | DD/12 | | | |
| 14 | 126 | DD | #12 | 12.6 | 7 | 42 | | | | | | | | | |
| | | EE | #12 | 12.6 | 7 | 42 | 20 | 2 | DD/12 | 7.98 | 7 | EE/12 | | | |
| | | FF | #12 | 12.6 | 7 | 42 | 21 | 7 | FF/12 | 2.57 | 2 | GG/14 | | | |
| 15 | 72 | GG | #14 | 14.6 | 6 | 36 | 22 | 4 | GG/14 | 4.62 | 4 | HH/14 | | | |
| | | HH | #14 | 14.6 | 6 | 36 | 23 | 2 | HH/14 | 14.6 | 12 | JJ/6 | 2.6 | 2 | KK/6 |
| 16 | 144 | JJ | #6 | 6.63 | 12 | 72 | | | | | | | | | |

TABLE I-continued

UNIT LOADING SIMULATION OF A 53' E-VAN

|  |  | KK | #6 | 6.63 | 12 | 72 | 24 | 10 | KK/6 | 7.84 | 7 | LL/7 |  |  |  |
| --- | --- | --- | --- | --- | --- | --- | --- | --- | --- | --- | --- | --- | --- | --- | --- |
| 17 | 132 | LL | #7 | 7.63 | 11 | 66 | 25 | 4 | LL/7 | 12.5 | 11 | MM/7 | 1.52 | 1 | NN/8 |
|  |  | MM | #7 | 7.63 | 11 | 66 |  |  |  |  |  |  |  |  |  |
| 18 | 150 | NN | #8 | 8.63 | 10 | 60 | 26 | 9 | NN/8 | 5.61 | 5 | PP/8 |  |  |  |
|  |  | PP | #8 | 8.63 | 10 | 60 | 27 | 5 | PP/8 | 9.61 | 5 | QQ/8 | 2.72 | 2 | RR/14 |
|  |  | QQ | #8 | 8.63 | 5 | 30 |  |  |  |  |  |  |  |  |  |
| 19 | 36 | RR | #14 | 14.6 | 6 | 36 | 28 | 4 | RR/14 | 4.62 | 4 | SS/14 | 0.62 |  |  |
| 20 | 54 | SS | #14 | 14.6 | 6 | 36 |  | 2 | SS/14 | 6.62 | 3 | TT/14 | 3.62 | 3 | TT/14 |
|  |  | TT | #14 | 14.6 | 3 | 18 | Lose 30 Cases and avg. 6.4 inch/posn. | | | | | | | | |
| Body | 1716 |  |  |  |  | 1716 |  | 105 X | 6 = 630 |  | 150 X | 6 = 900 |  | 29 X | 6 = 174 |
| Total | 2208 |  |  |  |  | 2208 |  | 2178 |  |  |  |  |  |  |  |

Figure 4:
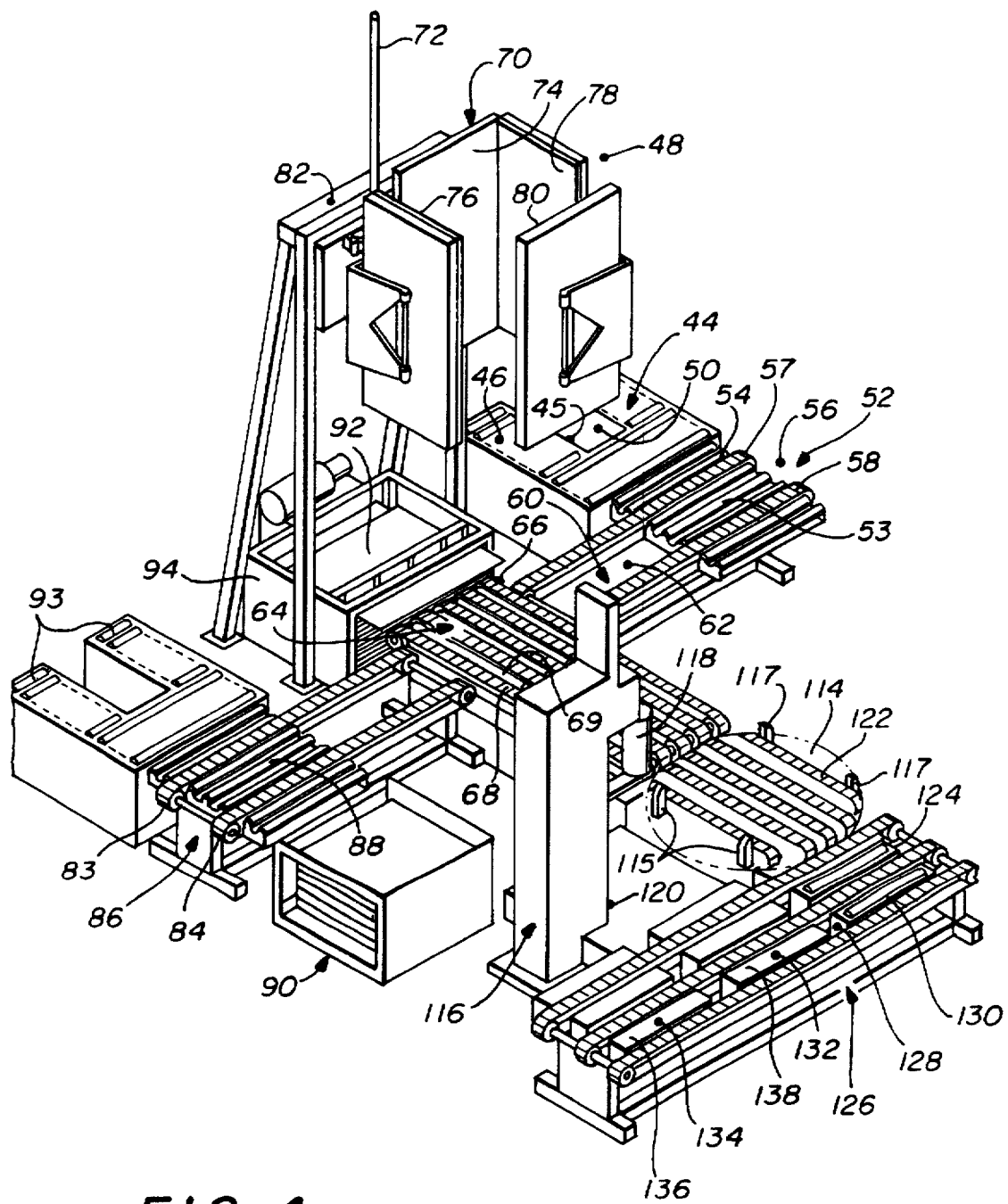
FIG. 4 is a diagrammatic representation of the novel invention that automatically delayers stacks of boxes and then stretch wraps the delayered stacks to form the sequential array of pallets that can be stacked in sequential order at predetermined location in an E-van to maximize use of the space therein.

FIG. 4 is a diagrammatic presentation of the novel computer control delayering system of the present invention. The stacks of cartons are sequentially brought to a first area 44 where each stack has layers of boxes of the same height and that may or may not be the same height as the layers of boxes in the next sequentially received stack. A pallet detector sensor 46 detects the presence of the pallet while sensor 48 determines the height of the pallet and sensor 50 determines the contents of the box by reading a bar code. This information is all coupled to a microprocessor 52 shown in FIG. 6. Already programmed into the microprocessor 52 through keyboard 51 are the inside dimensions of the vehicle being loaded, i.e. the E-van, various height of the different carton layers, and the bar codes representing the identification of the various products stored in the boxes or cartons. The computer can then calculate the maximum number of cartons to be stacked in each of the pallet locations 14-36 shown in FIG. 2.

When the first pallet of boxes is brought to receiving station 44 by forklift or other means, sensor 46 senses the box height, sensor 48 senses the stack height, and sensor 50 reads the product label to determine the contents of the boxes or cartons. This information is fed to the microprocessor or computer 52. That stack could have 12 layers of cartons and can be represented by 12A in FIGS. 3A and 3C. It would be stretch wrapped and placed in the E-van in the position shown in FIG. 3A (also 3C). Therefore in summary, detector 45 senses the pallet at the receiving station and enables the stack sensors to send signals to the computer regarding stack height, product type, and carton layer thickness or height all by sensors 46, 48, and 50. Then, the computer 52 causes the pallet to move on a platform such as frame-mounted rollers 54 to a transfer station 53 where a detector 56 senses the pallet position. The computer 52 then stops the rollers 54 and physically lowers them in a well-known fashion below the drive belts 57 and 58 thus allowing the drive belts 57 and 58 to move the pallet to the first storage area 60 where the pallet is sensed by a sensor 62. The pallet could be held in this area if necessary. If not necessary, the pallet is transferred to the delayering position 64 on rollers 69 where a detector 66 senses when the carton has reached the right location. The computer 52 then stops the rollers 69 and causes them to move below the drive belts 68.

At this point, the computer 52 causes the load delayering clamp 70 to move downwardly about hydraulic cylinder 72 until it has four sides or arms 74, 76, 78, and 80 surrounding a stack. The clamp arms close about the stack and lift it off the pallet board. When sensor 82 senses the load delayering clamp has lifted the stack off the pallet board, rollers 69 move the pallet board onto elongated moving belts 84 to carry the pallet board out from under the stack of cartons that has been lifted by the load delayering clamp 70. When the pallet board reaches transfer station 86, it is detected by sensor 87 and rollers 88 are activated by the computer to cause the pallet board to be stacked on top of stack 90. Alternatively, the computer 52 could send an entire pallet back to the warehouse by means of rollers 93. In the meantime, a slip sheet 92 from a slip sheet dispenser 94 is carried underneath the raised carton stack held by the load delayering clamp 70. Appropriate sensors (not shown) tell when the slip sheet 92 is in the proper position. The computer then directs the hydraulic system to lower the delayering clamp and enables the carton to be properly positioned on the slip sheet.

Figure 5A:
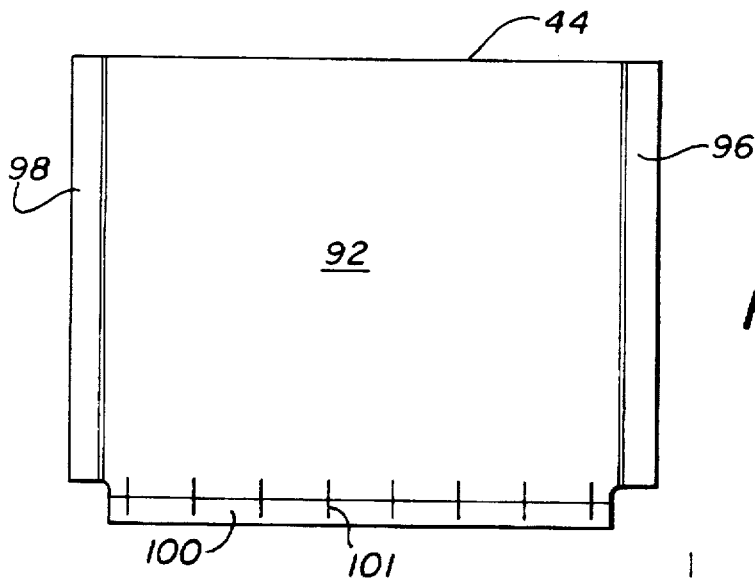
FIG. 5A is a plan view and FIG. 5B is a perspective view of the novel slip sheet of the present invention, with FIG. 5B illustrating the sides thereof folded upwardly to encompass the sides of the boxes in a stack prior to stretch wrapping the stack so that the stretch wrap can encompass the sides of the slip sheet and form a unitary stack.
Figure 5B:
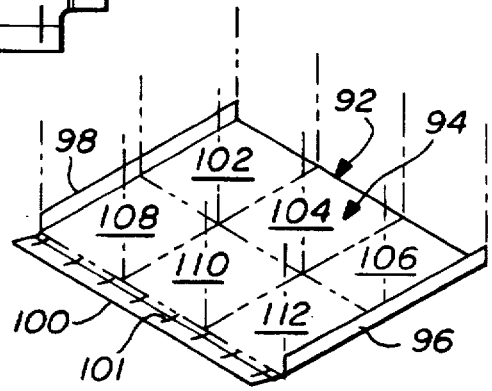

The slip sheet 92 is illustrated in detail in FIGS. 5A and B. As can be seen in FIG. 5A, the slip sheet 92 has a central load bearing area 94 with areas 96 and 98 extending beyond the stack of cartons on each side thereof. In addition, an extension 100 extends beyond the carton stack in the front thereof. It will be noted in FIG. 5B that the sides 96 and 98 are folded upwardly while the forward extending section 100 remains flat. Creaser 101 assists the extension 100 in remaining horizontal and not drooping down. The reason for the slip sheet 92 being folded up on the sides thereof is to encompass a portion of the stack of cartons when the stack of cartons arrives at the stretch-wrap machine such that the stretch wrap will include the vertical extensions 96 and 98 and thus form a solid base attached to the stack that will not be easily pulled from under the stack. Therefore when a forklift having a well-known slip sheet handling attachment as part thereof is used to move a stack, the slip sheet attachment on the forklift can grab the extension 100 and pull the stack onto the forklift forks for movement of the stack. In addition, when depositing the stretch-wrapped stack of cartons on top of another stack of cartons, the attachment can push the stack by means of the forward extension 100 and the portion of the forklift that engages the side of the carton stack as is well known in the art. One such machine is designated the PLP 35/45 in the art. It will be noted in FIG. 5B that six areas are shown numbered as 102, 104, 106, 108, 110, and 112. These areas represent the areas in which the cartons could be stacked in one layer. It will be noted that all cartons shown in FIG. 1 have the same length and width and simply have different heights. Thus they will all fit in the pattern shown in FIG. 5B.

Returning now to FIG. 4 it can be seen that once the slip sheet 92 has been placed under the stack, and the delayering clamp 70 places the stack on the slip sheet, the computer 52 then moves tracks 68 and transfers the stack and slip sheet to the stretch-wrap table 114.

The stretch-wrap device is well known in the art and comprises a rotating table 114 and the stretch-wrap unit 116. Appropriate sensors 120 detect when the stack of cartons is in the right position on table 114 and then table 114 rotates while the stretch wrap 118 is moved slowly up the side of the stack and down again until the entire stack of cartons is wrapped. It should be remembered, of course, that the stretch wrap encompasses the vertical extensions 96 and 98 of the slip sheet 92 to form a unitary stack. Vertical extensions 96 and 98 are folded upwardly along the sides of the stack by computer controlled arms 115 and 117. Stretch-wrap sensor 120 is illustrated but it should be understood that as many sensors as necessary may be used to properly position the carton stack.

Once the stack of cartons has been stretch wrapped, it is moved by tracks 122 onto rollers 124 at a first additional storage area 126. A detector 128 senses when the carton stack is in the right position and frame-mounted rollers 124 move downwardly below tracks 130 and tracks 130 carry the stack toward sensors 132 and 134 at second and third storage locations, respectively. If no stack is sensed by sensor 134 at the second storage area, then the cartons are transferred to the second storage area where the computer 52 causes plates 136 to move upwardly above tracks 130 thus maintaining the carton in the second storage area. If the next stretch-wrapped stack of cartons moves to the third storage position as detected by sensor 132, again, the computer raises the plates 138 above the tracks 130 and stores the carton stack in the third storage location. If the carton stacks are stored in both the second and third storage positions, additional storage area 126 may serve as the first storage area by moving frame-mounted rollers 124 upwardly above tracks 130 without turning the rollers 124.

Considering now Table I, the first pallet is identified as pallet A carrying case size #6 as shown in FIG. 1 having a case height of 6.63 inches with 12 layers per pallet and six cases per layer for a total of 72 cases in the pallet. It is stretch wrapped as indicated earlier and stored in the second storage area where sensor 134 is located. It may be picked up by a forklift and taken to the trailer or E-van and, as shown in FIG. 3C, may be placed in the area indicated 12A. The computer then calculates the remaining distance between the top of carton stack 12A and the top interior of the E-van. Since the second stack is identified as pallet B and contains case size #7, which has a case height of 7.63 inches with 11 layers per pallet and 66 cases per pallet, the computer knows that with the case height of 7.63 inches than an additional three cases can be placed on top of the stack 12A. Therefore the layering clamp 70 first lifts the entire stack to remove the pallet board and place a slip sheet thereunder. It then removes eight of the 11 cases from the stack, stretch wraps the other three cases, and enables the forklift to pick them up from one of the storage areas and place them on top of stack 12A as shown in FIG. 3C. The remaining eight cases of the B pallet are placed on a slip sheet and stretch wrapped and placed beside the stack 12A as shown in FIGS. 3A and 3B. The computer 52 then looks at the next stack designated as pallet C that comes into the system. It also has #7 cases with 7.63 inches case height, 11 layers per pallet, and 66 cases per pallet. It calculates that six of the #7 cases from the C pallet can sit on top of the eight B pallet cases shown in FIG. 3B. Therefore it removes five of the cases from the C pallet, stretch wraps the six remaining cases and allows them to be stacked on top of the eight B pallet cases as illustrated in FIG. 3B. Since there were five remaining cases in the C pallet, they are stretch wrapped and stacked as the next row in front of the 12A stack as illustrated in FIGS. 3A and 3C. The next pallet coming in is a D pallet with #7 cases, again having a case height of 7.63 inches, with 11 layers per pallet and 66 cases per pallet. The computer calculates that nine of the D pallet cases can sit on top of the five C pallet cases. Thus it removes two cases from the D pallet, stretch wraps the remaining nine layers , and allows them to be stacked on top of the five cases from the C pallet as shown in FIG. 3C. The remaining two cases from the D pallet are stretch wrapped and placed on the floor of the nose of the E-van in front of the 8B pallet stack as illustrated in FIG. 3B. The next stack is designated E and has #8 size cases having a case height of 8.63 inches with ten layers per pallet and 60 cases per pallet. The computer 52 calculates that ten layers, the entire E pallet, can be stacked on top of the two D pallet layers. Thus that pallet is stretch wrapped and placed on top of the two D pallet layers as shown in FIG. 3B. By using Table I and FIG. 3, it can be seen how the computer decides to delayer a certain number of cases in each incoming stack to make sure that maximum use is made of the interior of the van.

Figure 6:
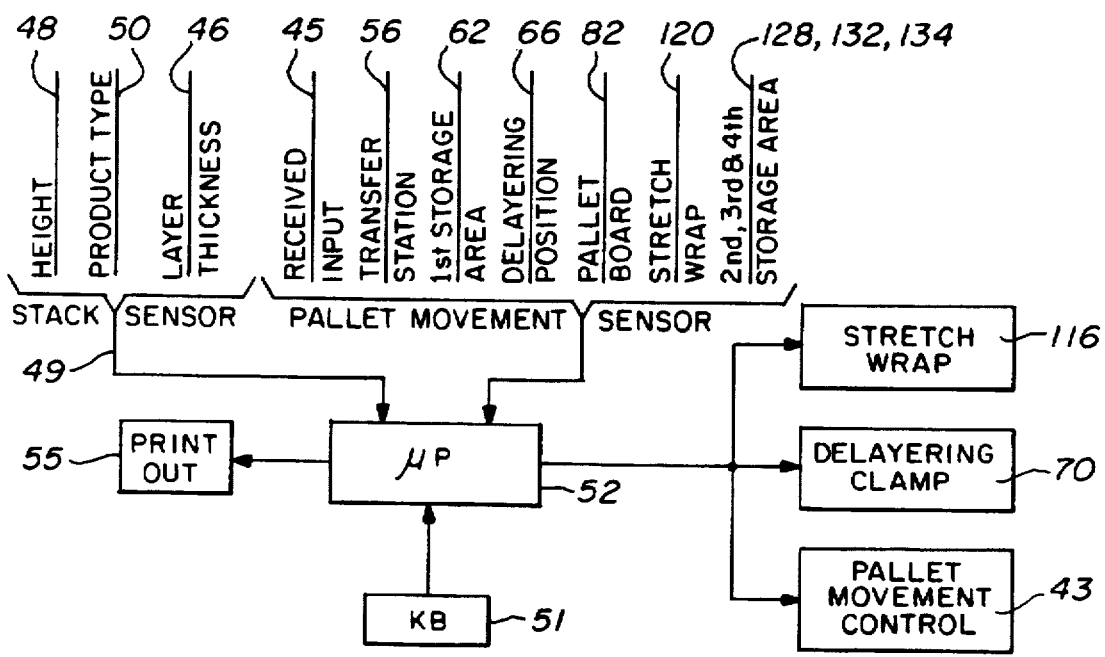
FIG. 6 is schematic diagram of the electrical control system of the present invention.

FIG. 6 discloses the schematic diagram of the electrical system utilized to operate the delayering clamp system of FIG. 4. Note that microprocessor 52 can have input therein from keyboard 51 of any data relating to the carton, and the dimensions of the van or cargo space into which the cartons are going to be loaded. Stack sensor 46 is a "smart" linear sensor and sensor 50 is a bar code reader, both well known in the art. The stack sensors 46, 48, and 50 indicating the layer thickness, the height and the product type are coupled to the microprocessor through line 49 as they are sensed with sensors that detect the received carton stack. As the carton stack moves from one location to the other, sensor 45 senses the received carton stack, sensor 56 detects the carton stack when received at the transfer station 53, sensor 62 represents the stack received at the first storage area 60, sensor 66 represents the stack received at the delayering position 64, sensor 82 detects when the pallet board has been removed from under the stack, sensor 120 detects when the carton arrives at the stretch-wrap unit 116 in the proper position and is completely stretch wrapped, and sensors 128, 132, and 134 detect when the carton stack is in the second, third and fourth storage areas as explained previously. With the use of these pallet movement sensors and the stack sensor signals, the microprocessor 52 can control the stretch-wrap unit 116, the delayering clamp 70, and the pallet movement controls which include the rollers such as rollers 54 and moving track units such as tracks 58 at the transfer station 60. Of course, all of the other rollers and moving tracks as described earlier are also controlled by the microcomputer or programmable logic controller (PLC) by appropriate signals from the pallet movement sensors as indicated by pallet movement control block 43.

In an alternative embodiment as shown in FIG. 7, the output of the second storage area where the cartons are sensed by sensor 134 may be fed to an automatic telescoping loader 140 that has three telescoping sections 142, 144, and 146. This device is similar to the one disclosed in U.S. Pat. No. 5,403,142 and has on the front end thereof a side shift push-pull attachment 148 for fork truck loading. It includes a vertical shaft 150 mounted for horizontal movement on a horizontal plate 152. The forklift 154 is mounted on the vertical shaft 150 for vertical movement up and down, horizontal movement from side-to-side on the horizontal plate 152, and also turns 180° to pick up the slip-sheeted and stretch-wrapped load. The slip sheet gripper 156 allows the forklift to grip a pallet by the leading edge 100 of the slip sheet shown in FIG. 5B and pull it onto the forks 154 of the forklift. The fork lift attachment 148 can then extend into the trailer and load the pallet either in a vertical or horizontal location as determined by the computer to stack it properly. The novelty of the present automatic system lies in the manner in which the loading is precalculated and the delayering device is operated to create a carton stack of the proper height which is then stretch wrapped and taken by either by manually operated forklift or the automated forklift into the truck and stacked.

Thus there has been disclosed a truck body loading device that configures a stack of layers of boxes to fill an enclosed compartment in sequential stack locations according to measurements of the compartment as stored by a computer and the box layer height as determined by the computer. Specifically, the device employs the computer to calculate the maximum height of the stack in each predetermined stack location in the cargo van necessary to fill the interior thereof, directs a delayering clamp to index itself relative to a stack of boxes, and then removes as many boxes as necessary from the stack. The stack is then fed to a stretch-wrap station where the stack is rotated while the stretch wrap is being applied. The stretch-wrapped stack is then transferred to a station for holding for a forklift or an automated device to take it into the truck and position it.

In an alternate version, an automatic loader extends into the body interior of the truck being loaded, the pallets are stacked by a special loader that can turn 180°, pick up a pallet, rotate back 180°, and then stack the pallets in the proper vertical or horizontal location.

The system includes a microprocessor for receiving sensor inputs concerning stack height, product type, and case layer height and with data entered into the processor through a keyboard concerning the type of trailer that is being loaded. The trailer file in the computer will have the trailer or van type and its dimensions. The product file will have case size and the product stored therein. The microprocessor includes a programmable logic controller that takes the data stored in the microprocessor and positions the stack of cartons such that, according to the calculations of the computer, a number of cases are removed from the stack by a delayering clamp, as necessary to fill a stack location in the enclosed cargo vehicle to its maximum. Thus, for example, if the vehicle could receive a stack of 12 boxes, cartons, or cases of a particular height and the pallets are stacked eight high, the computer would cause the load delayering clamp to remove four boxes from one stack leaving four boxes in the stack. Those four boxes that were left would be sent to the stretch-wrap station so that they could be formed into a unitary group with the stretch wrap. From there the computer transfers them to a holding point where a forklift can pick them up and deliver them into the trailer. The computer would then take the remaining four boxes and stretch wrap them and place them in a holding pattern for the next calculation. A new stack of boxes eight high would then be moved directly to the stretch wrap station to be stretch wrapped and moved to a waiting station where the forklift could take them into the trailer and place them on top of the four-box stack already there to form a 12-box stack. In like manner, as the box layers vary in size, the computer calculates the number of boxes needed in a stack to again occupy the maximum space in a trailer. When a stack of boxes first arrives at the loading device, a first sensor determines the height of the stack and a bar code reader identifies the product. In addition, a linear sensor determines the box layer height. This information is all fed to the computer. By the time the pallet of boxes is moved from the detector station to the transfer station and then to the load delayering clamp, the computer has determined how high the stack should be and causes the load delayering clamp to move downwardly about the stack a sufficient distance to close its clamps, grip the boxes that need to be removed, and raise them up leaving the remaining boxes to be transferred to the stretch-wrap unit. If a portion of the stack is to be returned as excess, then the sequence at the delayering station will be as follows. The load/stack on the pallet board will move in area 64. The claws will come down and stop at a predetermined position as directed by the computer, lift only the layer/quantity needed for the trailer, and leave the rest on the pallet board which will advance to the partial return position 93.

The invention also includes a novel slip sheet that is placed under each stack as it is moved into place under the load delayering clamp. The slip sheet is formed of a material such as TEFLON® and has a front portion extending outwardly beyond the front of the stack that acts as a tongue that can be gripped by a special fork loader, well known in the art. However, the novel slip sheet has two sides extending outwardly beyond the side edges of the stack that can be folded up and encompassed by the stretch wrap to form a solid base for the carton stack. The tongue on this slip sheet allows the special push-pull attachment for the forklift to remove the pallets from wherever they are stored.

The corresponding structures, materials, acts, and equivalents of all means or step plus function elements in the claims below are intended to include any structure, material, or act for performing the function in combination with other claimed elements as specifically claimed.

I claim:

1. A system for sequentially receiving stacks of boxes of product in multiple layers, each layer having at least two boxes, and effectively loading the maximum number of layers of boxes in an enclosed cargo space comprising:

- a first area for sequentially receiving stacks of boxes, each stack having layers of boxes of the same height, which height may or may not be the same height as the layer of boxes in the next sequentially received stack;
- a programmable microprocessor for (1) storing a stack location and maximum height in given sequential locations in said enclosed cargo space and (2) determining how many layers of boxes of each sequentially received stack must be placed in a given stack location in said cargo space to provide the maximum height stack in said given stack location;
- box delayering means coupled to said programmable microprocessor for sequentially receiving said stacks of boxes from said first area and removing as many layers of boxes from each received stack as determined by said programmable microprocessor to create said maximum height stack;
- a stretch-wrap machine for sequentially receiving the delayered stacks of boxes stretch wrapping said delayered stacks into unitary stacks; and a second area for sequentially receiving and temporarily storing said stretch-wrapped stacks of boxes; and means for sequentially transporting said stretch-wrapped stacks of boxes to said enclosed cargo area in proper order and for stacking them in each given stack location to maximize use of said enclosed cargo area.

2. A system as in claim 1 wherein said first area further comprises:

a first sensor for generating a first signal representing the height of each received stack of boxes;

a second sensor for generating a signal representing the height of the individual layer of boxes in said stack;

a third sensor for generating a signal representing the product contained in said boxes in said stack; and circuit means for coupling said first, second, and third signals to said microprocessor for use by said processor in determining said maximum stack height.

3. A system as in claim 1 wherein said box delayering means further comprises:

a programmable logic controller;

a first sensor for determining when each sequential stack of boxes is received by said delayering means;

a delayering clamp controlled by said programmable logic controller for surrounding at least a part of each of said sequentially received stack of layers of boxes at a height determined by said microprocessor and delayering each said stack by clasping and lifting any layers of boxes required to be removed from each said stack to form said delayering stacks; and conveyor means controlled by said programmable logic controller for moving said sequentially formed delayered stacks to said stretch-wrap machine.

4. A system as in claim 3 further comprising:

a pallet board under each received stack of boxes;

a pallet board storage area;

a slip sheet storage area; and said programmable logic controller causing each said received stack of boxes to be raised off said pallet board by said delayering clamp, said pallet board being transferred to said pallet board storage area, one of the slip sheets being removed from the slip sheet storage area and placed under said raised stack of boxes, and said raised stack of boxes lowered and placed on said slip sheet.

5. A system as in claim 4 wherein said slip sheet extends outwardly beyond said stack of boxes on at least the front and opposing sides thereof.

6. A system as in claim 5 wherein said stretch-wrap machine comprises:

a rotatable platform coupled to said programmable logic controller for sequentially receiving said delayered stacks of boxes;

an additional sensor for determining when said delayered stack of boxes is centered on said rotatable platform;

a source of stretch-wrap material;

said programmable logic controller causing said platform to rotate and said source of stretch-wrap material to be applied to said dislayered stack of boxes to stretch wrap said dislayered stack of boxes with said stretch-wrap material and form a unitary dislayered stack; and said programmable logic controller causing said platform to stop rotating when said stack of boxes has been completely stretch wrapped.

7. A system as in claim 6 wherein said stretch-wrap machine further comprises:

arms on said rotatable table associated with opposing side extensions of each of said slip sheets; and said programmable logic controller being coupled to said arms to force said arms against only said opposing side extensions of said slip sheet to fold them up alongside of said stack of boxes so as to be engaged by and held in place by said stretch-wrap material and said stack is stretch wrapped.

8. A system as in claim 1 further including:

a first conveyor means for transporting said stacks of boxes sequentially to said first area;

a second conveyor system for transporting said stack of boxes from said first area to said box delayering means for delayering by removing as many boxes as instructed by said programmable logic controller;

a third conveyor system for transporting said delayered stacks of boxes from said delayering means to said stretch-wrap machine;

a fourth conveyor means for transporting said stretch-wrapped stacks of boxes from said stretch-wrap machine to a temporary storage area; and a fifth elongated conveyor system for receiving stacks of boxes from said stretch-wrap machine and storing them at various locations along said elongated fifth conveyor system.

9. A system as in claim 8 wherein:

said first conveyor system is perpendicular to said second conveyor system;

said second conveyor system is perpendicular to said third conveyor system;

said third conveyor system is parallel to said first conveyor system;

said fourth conveyor system is in longitudinal alignment with said third conveyor system; and said fifth conveyor system is perpendicular to said fourth conveyor system and parallel to said second conveyor system.

10. A system as in claim 9 wherein:

said first conveyor system has frame-mounted rollers driven by said programmable logic controller;

said second perpendicular conveyor system has endless tracks with a portion thereof interposed between at least some of said rollers for movement parallel to the longitudinal axis of said rollers; and said frame on which said rollers are mounted being moved by said programmable logic controller from a first position, with said rollers projecting above said endless tracks for allowing said box stacks to be moved by said first conveyor system rollers, to a second position with said frame-mounted rollers below said endless tracks to allow said endless tracks to move said box stacks to said delayering means.

11. A system as in claim 9 further comprising:

endless tracks on said rotating platform forming a first portion of said fourth conveyor system;

driven rollers forming a second portion of said fourth conveyor system;

at least two endless tracks forming said elongated fifth conveyor system, said endless tracks having a portion thereof interposed between at least some of said driven rollers forming said second portion of said fourth conveyor system for movement parallel to the longitudinal axis of said driven rollers of said fourth conveyor system; and a frame on which said fourth driven rollers are mounted, said frame being moved by said programmable logic controller from a first position, with said rollers projecting above said endless tracks of said fifth conveyor system for allowing said box stacks to be moved by said fourth conveyor system rollers to a second position with said rollers below said endless tracks of said fifth conveyor system to allow said endless tracks to move said box stacks to at least two additional storage areas.

12. A system as in claim 11 further including:

at least first and second spaced platforms located in alternating relationship with said at least two endless tracks of said fifth conveyor system;

said first and second spaced platforms being moved by said programmable logic controller from a first position below said endless tracks, to allow said endless tracks to move said box stacks, to a second position above said endless tracks to support one of said box stacks in a storage position; and a sensor associated with each of said first and second spaced platforms to signal said programmable logic controller when a box stack is in a position to be stored.

13. A system as in claim 12 further including:

an extendable box stack loader boom abutting at least one of said spaced platforms and extendable into said enclosed cargo space;

a box stack handling device on the end of said extendable boom, said box stack handling device providing the means for picking up, rotating, carrying, and positioning the box stacks in the enclosed cargo space; and said programmable logic controller coupled to sensors on said box stack handling device for providing vertical movement, lateral movement, and rotation of said box stack handling device to properly position said box stacks in said enclosed cargo space.

14. A system as in claim 13 further comprising a slip sheet gripper on said box stack handling device for gripping the front extended edge of the slip sheet under the stretch-wrapped box stack to remove the box stack from storage and to force the box stack into its proper position in said enclosed cargo space.

* * * * *